US011811086B2

(12) United States Patent
Derrien

(10) Patent No.: US 11,811,086 B2
(45) Date of Patent: Nov. 7, 2023

(54) ALKALINE BATTERY SEPARATORS HAVING CONTROLLED PORE SIZE

(71) Applicant: SWM Luxembourg SARL, Contern (LU)

(72) Inventor: Stéphane Derrien, Quimperlé (FR)

(*) Notice: Subject to any disclaimer, the term of this patent is extended or adjusted under 35 U.S.C. 154(b) by 524 days.

(21) Appl. No.: 16/765,138

(22) PCT Filed: Sep. 26, 2018

(86) PCT No.: PCT/IB2018/057465
§ 371 (c)(1),
(2) Date: May 18, 2020

(87) PCT Pub. No.: WO2019/064205
PCT Pub. Date: Apr. 4, 2019

(65) Prior Publication Data
US 2020/0350541 A1   Nov. 5, 2020

Related U.S. Application Data

(60) Provisional application No. 62/563,291, filed on Sep. 26, 2017.

(51) Int. Cl.
C08L 1/02       (2006.01)
H01M 50/414    (2021.01)
H01M 50/44     (2021.01)
H01M 50/429    (2021.01)
H01M 50/489    (2021.01)
H01M 50/494    (2021.01)

(52) U.S. Cl.
CPC ............... H01M 50/44 (2021.01); C08L 1/02 (2013.01); H01M 50/414 (2021.01); H01M 50/429 (2021.01); H01M 50/4295 (2021.01); H01M 50/489 (2021.01); H01M 50/494 (2021.01); C08L 2203/20 (2013.01); C08L 2205/025 (2013.01); C08L 2205/03 (2013.01); C08L 2205/16 (2013.01)

(58) Field of Classification Search
CPC .................................................. H01M 50/414
See application file for complete search history.

(56) References Cited

U.S. PATENT DOCUMENTS 5,336,573 A     8/1994  Zuckerbrod et al.
5,645,956 A *   7/1997  Degen ................... H01M 50/44
                                                   429/142
2003/0096171 A1  5/2003  Thrasher et al.
2008/0305389 A1 12/2008  Arora et al.
2013/0149614 A1  6/2013  Kubo et al.
2013/0183569 A1  7/2013  Hayakawa et al.
2014/0134498 A1  5/2014  Lim et al.
2014/0217013 A1* 8/2014  Sato ................... H01M 50/494
                                                   428/398
2016/0049627 A1* 2/2016  Hu .................... H01M 50/4295
                                                   429/406
2017/0232371 A1* 8/2017  Anantharamaiah ...........
                                                   D04H 1/43838
                                                   55/528
2020/0063373 A1  2/2020  Parker et al.

FOREIGN PATENT DOCUMENTS

| EP | 2940703 A1 | 11/2015 |
| EP | 3952017 A1 | 2/2022 |
| JP | H0574439 A | 3/1993 |
| JP | 2012109268 A | 6/2012 |
| JP | 2014026877 A | 2/2014 |
| JP | 2014123443 A | 7/2014 |
| JP | 2015109290 A | 6/2015 |
| JP | 2017157348 A | 9/2017 |
| JP | 2017157349 A | 9/2017 |
| WO | WO 2017146825 A1 | 8/2017 |
| WO | WO2017/150439 A1 | 9/2017 |
| WO | WO 2017150439 A1 | 9/2017 |
| WO | WO2019064205 A1 | 4/2019 |

OTHER PUBLICATIONS

European Patent Office; International Search Report; International Patent Application No. PCT/IB2018/057465; dated Dec. 13, 2018.
China National Intellectual Property Administration (CNIPA); Office Action; PRC (China) Patent Application No. 201880062729.8; dated Feb. 24, 2022.
European Patent Office; Communication Pursuant to Article 94(3) EPC; EP Application No. 18807115.3 dated Mar. 24, 2022.
International Search Report and Written Opinion; International Application No. PCT/US2022/043543; dated Dec. 28, 2022.
China National Intellectual Property Administration (CNIPA); Office Action; PRC (China) Patent Application No. 201880062729.8; dated Sep. 23, 2022.
European Patent Office; Communication Pursuant to Article 114(2) EPC; EP Application No. 18807115.3 dated Jun. 29, 2021.
Ji et al., "Cellulose and poly(vinyl alcohol) composite gels as separators for quasi-solid-state electric double layer capacitors" Cellulose 26, 1055-1065 (2019); Nov. 12, 2018 (Nov. 12, 2018) entire document, especially abstract, p. 1057 (Abstract Only). [online] <https://link.springer.com/article/10.1007/s10570-018-2123-6#citeas>.

* cited by examiner

Primary Examiner — Jeffrey C Mullis
(74) Attorney, Agent, or Firm — Farber LLC

(57) ABSTRACT

An alkaline battery separator is made from a blend of polyvinyl alcohol and a cellulose derivative, and has a controlled pore size.

14 Claims, No Drawings

ALKALINE BATTERY SEPARATORS HAVING CONTROLLED PORE SIZE

CROSS-REFERENCE TO RELATED APPLICATIONS

This application is a national stage application, filed under 35 U.S.C. § 371, of International Patent Application No. PCT/IB2018/057465, filed on Sep. 26, 2018, which claims the benefit of U.S. Provisional Application No. 62/563,291, filed on Sep. 26, 2017, both of which are incorporated by reference herein in their entirety.

TECHNICAL FIELD

This disclosure relates generally to an alkaline battery separator comprising a blend of polyvinyl alcohol and cellulose or cellulose derivatives having controlled pore size and methods of making such separators.

BACKGROUND

Separator papers for alkaline batteries serve as a mechanical barrier between the electrodes to prevent shorting while allowing for ionic transport through the electrolyte in the pores. Separators should have good mechanical integrity, chemical inertness, well-defined and consistent porosity and tortuosity in order to uniformly transport the ions between the electrodes. Separator papers used in alkaline batteries often comprise blends of polyvinyl alcohol (PVA) fibers and cellulose or cellulose derivatives such as rayon or Tencel. Generally, PVA fibers promote dimensional stability in the potassium hydroxide electrolyte, while cellulose and its derivatives support absorption properties.

In addition to fiber composition, separators are designed at various levels of basis weight. The availability of low count PVA, as well as rayon fibers, has enabled a trend toward lighter material, targeting space savings in the cells to permit higher amounts of active material and enhance discharge performance. However, low levels of basis weight are no longer considered the ultimate target in view of technical and economic concerns. Technical issues include processability causing stiffness, as well as mechanical characteristics in batteries leading to poor drop resistance. Inclusion of low count fibers contribute significantly to costs. New types of anodes with higher performance have been developed; however, these anodes also have a higher tendency to generate dendrites which cause short circuits, leading battery manufacturers to seek barrier property reinforcement.

There is a need for a separator that has a controlled, predetermined pore size, i.e., mean and maximum size and volume can be preselected.

SUMMARY

The disclosure generally relates to an alkaline battery separator comprising a blend of PVA and a cellulose derivative having controlled pore size of less than about 4.0 µm.

In one embodiment, the separator comprises about 30% to about 60% of PVA and about 40% to about 60% of lyocell fibers such as Tencel. In another embodiment, the separator comprises at least 55% of PVA and at least 45% of Tencel.

In one embodiment, the alkaline battery is a $Zn/MnO_2$ battery.

In another aspect, the disclosure relates to a method of making an alkaline battery separator having a controlled pore size comprising highly fibrillating a cellulose derivative and, optionally, cellulose and combining with PVA.

The recitation herein of desirable objects which are met by various embodiments of the present disclosure is not meant to imply or suggest that any or all of these objects are present as essential features, either individually or collectively, in the most general embodiment of the present disclosure or in any of its more specific embodiments.

DETAILED DESCRIPTION

Except as otherwise noted, any quantitative values are approximate whether the word "about" or "approximately" or the like are stated or not. The materials, methods, and examples described herein are illustrative only and not intended to be limiting. Any molecular weight or molecular mass values are approximate and are provided only for description.

Disclosed herein is an alkaline battery separator comprising a blend of polyvinyl alcohol and a cellulose derivative. The separator has a controlled pore size, i.e., the pore size can be predetermined or preselected. In some embodiments, the alkaline battery separator comprises a blend of polyvinyl alcohol, a cellulose derivative, and cellulose. The separator can be used in various alkaline batteries such as a $Zn/MnO_2$ battery.

The cellulose and cellulose derivatives can include but are not limited to natural cellulose (wood fiber and pulp, cotton, hemp, etc.) and regenerated cellulose (e.g., rayon and Tencel).

The separator can comprise PVA in a ratio (by weight) of at least about 20%, at least about 30%, and at least about 55%. The separator can comprise lyocell fibers such as Tencel in a ratio (by weight) of at least about 25%, at least about 35%, and at least about 45%. In one embodiment, the separator comprises PVA of at least 55% and lyocell fibers such as Tencel of at least 45%. The separator can comprise about 0% to about 30% of cellulose.

Generally, a method of making the separator comprises highly fibrillating a cellulose derivative, for example, lyocell fibers such as Tencel, and optionally, cellulose, before combining with PVA. Cellulose fibrillation can be achieved using mechanical refiners such as a single disc refiner, a double disc refiner, a conical refiner, a rotating cylinder refiner, or other types of refiners used to mechanically grind or process cellulose or cellulose derivatives to produce individual fibers and smaller fibrillar elements. The feed material for this process may be previously treated cellulosic material (such as wood chips, annual plants, etc.) formed into pulp. The previous treatment of the cellulosic material to produce pulp used as the feed material can be a result of chemical digestion, such as Kraft cooking, sulfite cooking, soda cooking, etc., mechanical refining, a combination of chemical digestion and refining, or other known processes.

Fibrillation can be of various duration and energy levels, such as 125 min. to 200 min. at 185 KW to 200 KW of total energy corresponding to a Specific Edge Loading (SEL) of 0.65 to 0.75 J/m. The fibrillation process is performed on 30 g/l fiber suspensions. Generally, fibrillation occurs over a long period of time at a low energy, the goal being to introduce a given amount of energy such as 1200 to 1500 KWH/T of total energy (700 to 1150 kWh/T of specific energy) to the cellulose to reach a fibrillation level in the range of 140 and 100 Canadian Standard Freeness (CSF) and even between 37 and 25 CSF. Resultant fibrillated fibers typically have a width of 16-20 microns and a length of 1000 to 1150 microns. In the fibrillation process, the long duration is preferred to the high level of energy in order to avoid fiber cutting.

Once the fibrillation process has been performed and controlled, the cellulose and/or cellulose derivative is diluted with cold water to cool down the temperature below 40° C. in anticipation of the addition of both water soluble and subject PVA fibers in the pulper. Both types of PVA fibers typically have cut lengths of 2 to 4 mm. When thinner fibers (e.g., lower denier (d) or dTex) are used, fibers of shorter length are necessary to avoid unexpected fiber entanglement. The fiber blend is thoroughly mixed in the pulper before being transferred into the papermachine chest.

When tested on a PMI sizer, typical separators weighing between 20 and 40 g/m$^2$ have mean pore sizes ranging between 1.6 to 12 microns and max pore sizes ranging between 6 to 40 microns. The highly fibrillated fibers described herein have a smaller mean pore size, a smaller max pore size, and a smaller difference between mean and maximum pore size.

The mean pore size of the separator described herein can be less than about 5 microns, less than about 4 microns, less than about 3 microns, and less than about 2.0 microns. The max pore size can be less than about 16 microns, e.g., about 4 microns to about 25 microns, about 5 microns to about 20 microns and about 9 microns to about 16 microns. In one embodiment, the mean pore size is about 1.5 microns to about 3 microns.

EXAMPLES

Example 1: PVA (0.5 d) (VPB 0.53) and soluble PVA (VPB 105-2) were purchased from Kuraray Co. Tencel (Lenzing Co.), cut in 3 mm length, was subjected to fibrillation using a 24" double disc refiner for 115 minutes under a SEL of 0.65 J/m to reach a CSF of 117 and a final fiber length of 1.1 mm. Once the fibrillation process was performed and controlled, the fibrillated Tencel fibers were diluted with cold water to cool down the temperature below 40° C. before proceeding to the addition of both water soluble and subject PVA fibers in the pulper. The fiber blend was thoroughly mixed in the pulper for 10 min. before being transferred into the papermachine chest. The slurry was processed on an inclined wire papermachine at a speed of 90 m/min to produce a porous sheet having the parameter described in Table 1. Thickness and MD and CD tensile strength were measured in compliance with respectively ISO 534 and ISO 1924-2. Thickness was measured by applying pressure at 100 kPa and 20 kPa. KOH absorption capacity and speed were measured by standard methods of the industry from 34% KOH solutions. Mean and max pore size was measured in compliance with ASTM 316.

Example 2 was prepared as described for Example 1, except subject PVA fiber was selected at 0.3 d (VPB 033; Kurary Co.) and Tencel fibrillated to 120 CSF after fibrillation during 155' under a SEL of 0.69 J/m. The PVA and Tencel were combined at a ratio of 55%:45% by weight before being processed on the papermachine.

Example 3 was prepared as described for Example 2, using 0.3 d PVA VPB 033. A first batch of 1.7 dTex Tencel was fibrillated at 250° CSF through 20' of refining under a SEL of 0.52 J/m. A second batch of Tencel, brought to a fibrillation degree of 30 CSF through 34 hours of refining under a SEL of 0.08 J/m was prepared. A fiber blend made of 55% of PVA, 33% of Tencel from the first batch and 12% of Tencel from the second batch was then processed on the paper machine.

Example 4 was prepared as described for Example 3, using 0.3 d PVA VPB 033. A batch of 1.4 dTex Tencel was fibrillated at 95 CSF through 135' of refining under a SEL of 0.52 J/m. The PVA and Tencel were combined at a ratio of 40%:60% by weight before being processed at 30 g/m$^2$ on the papermachine.

Example 5 was prepared as described for Example 4, using 0.3 d PVA VPB 033. A batch of 1.4 dTex Tencel was fibrillated at 95 CSF through 135' of refining under a SEL of 0.52 J/m. The PVA and Tencel were combined at a ratio of 55%:45% by weight before being processed at 20 g/m$^2$ on the papermachine.

TABLE 1

| | | Example 1 | Example 2 | Example 3 | Example 4 | Example 5 |
|---|---|---|---|---|---|---|
| Fiber blend | Subject PVA | 43% - 0.5d | 43% - 0.3d | 43% - 0.3d | 26% - 0.3d | 41% - 0.3d |
| | Soluble PVA | 12% | 12% | 12% | 14% | 14 |
| | Tencel | 45% - 117 CSF | 45% - 120 CSF | 33% - 248 CSF 12% - 37 CSF | 60% - 95 CSF | 45% - 95 CSF |
| Basis weight | g/m$^2$ | 33.0 | 30.1 | 30.0 | 30 | 19.5 |
| Thickness 100 kPa | μm | 101 | 91 | 89.2 | 83.5 | 60 |
| Thickness 20 kPa | μm | 110 | 101 | 99.3 | 89.8 | 70 |
| MD Tensile strength | cN/15 mm | 3600 | 2900 | 2555 | 3700 | 2200 |
| CD Tensile strength | cN/15 mm | 2200 | 1250 | 1345 | 1175 | 790 |
| KOH Absorption | g/m$^2$ | 160 | 155 | 155.8 | 152 | 120 |
| Capillary rise in KOH | mm/5 mn | 18.0 | 11 | 6.2 | 4.0 | 4.0 |
| Air Permeability | cm3/cm$^2$ mn (1 kPa) | 1100 | 1250 | 756.0 | 275 | 850 |

TABLE 1-continued

|  | | Example 1 | Example 2 | Example 3 | Example 4 | Example 5 |
|---|---|---|---|---|---|---|
| R Index | | 0.975 | 0.999 | 1.0 | 1.0 | 0.97 |
| MEAN PORE SIZE | μm | 2.9 | 2.5 | 1.6 | 1.2 | 1.85 |
| MAX PORE SIZE | μm | 19.7 | 14.0 | 9.2 | 5.2 | 14.0 |

While the invention has been described in detail herein in accordance with certain preferred embodiments thereof, many modifications and changes therein may be effected by those skilled in the art. Accordingly, the foregoing disclosure should not be construed to be limited thereby but should be construed to include such aforementioned obvious variations and be limited only by the spirit and scope of the following claims.

What is claimed is:

1. An alkaline battery separator comprising a blend of about 40% polyvinyl alcohol and about 60% lyocell fibers and wherein the separator has a max pore size of about 5.2 microns or less.

2. The alkaline battery separator of claim 1, wherein the separator has a mean pore size of less than about 4.0 μm.

3. The alkaline battery separator of claim 1, wherein a thickness of the alkaline battery separator is from about 60 μm to about 100 μm when under 100 kPa of pressure.

4. The alkaline battery separator of claim 2, wherein the separator has an MD tensile strength from about 2200 cN/15 mm to about 3600 cN/15 mm.

5. The alkaline battery separator of claim 4, wherein the MD tensile strength of the alkaline battery separator is from about 2500 cN/15 mm to about 2900 cN/15 mm.

6. The alkaline battery separator of claim 1, wherein an the amount of soluble polyvinyl alcohol in the blend is from about 12% to about 14%.

7. The alkaline battery separator of claim 1, wherein the capillary rise in KOH of the alkaline battery separator is from about 4 mm/5 mn to about 18 mm/5 mn.

8. An alkaline battery comprising:
first and second electrodes; and
a separator positioned between the first and second electrodes, the separator made from a blend of about 60% polyvinyl alcohol and about 40% lyocell fibers, wherein the separator has a max pore size of about 5.2 microns or less.

9. The alkaline battery of claim 8, wherein the separator has a mean pore size of less than about 4.0 μm.

10. The alkaline battery of claim 8, wherein a thickness of the separator is from about 60 μm to about 100 μm when under 100 kPa of pressure.

11. The alkaline battery of claim 9, wherein the separator has an MD tensile strength from about 2200 cN/15 mm to about 3600 cN/15 mm.

12. The alkaline battery of claim 11, wherein the MD tensile strength of the separator is from about 2500 cN/15 mm to about 2900 cN/15 mm.

13. The alkaline battery of claim 8, wherein an amount of soluble polyvinyl alcohol in the blend is from about 12% to about 14%.

14. The alkaline battery of claim 8, wherein the capillary rise in KOH of the separator is from about 4 mm/5 mn to about 18 mm/5 mn.

* * * * *